United States Patent
Nakabayashi et al.

(10) Patent No.: US 7,989,563 B2
(45) Date of Patent: Aug. 2, 2011

(54) RESIN COMPOSITIONS, FILMS USING THE SAME AND PROCESS FOR PRODUCING THE FILMS

(75) Inventors: Masahito Nakabayashi, Saitama (JP); Mamoru Kobayashi, Saitama (JP)

(73) Assignees: Lintec Corporation, Tokyo (JP); Showa Denko K.K., Tokyo (JP)

( * ) Notice: Subject to any disclaimer, the term of this patent is extended or adjusted under 35 U.S.C. 154(b) by 345 days.

(21) Appl. No.: 12/388,077

(22) Filed: Feb. 18, 2009

(65) Prior Publication Data

US 2009/0209718 A1   Aug. 20, 2009

(30) Foreign Application Priority Data

Feb. 20, 2008  (JP) ................ 2008-039011

(51) Int. Cl.
*C08F 222/10* (2006.01)
*B05D 3/06* (2006.01)
(52) U.S. Cl. ...................... 526/135; 427/487
(58) Field of Classification Search ............ 526/325; 427/487
See application file for complete search history.

(56) References Cited

U.S. PATENT DOCUMENTS 6,262,211 B1 * 7/2001 Clontz et al. ................ 526/314

FOREIGN PATENT DOCUMENTS

EP             980025 A1 *   2/2000

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The present invention provides a resin composition containing a reactive monomer and/or oligomer having allyl ester groups, a film of the resin composition which is excellent in transparency and heat resistance and has a high thickness precision, and a process for producing such a film. The resin composition includes (A) a reactive oligomer having allyl ester groups and represented by the general formula (1):

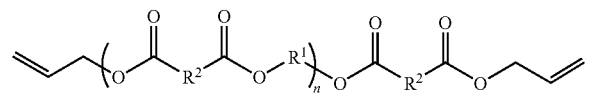

(1)

wherein $R^1$ represents an alkanediyl or alkenediyl group having 1 to 4 carbon atoms with the proviso that a plurality of $R^1$ groups may be the same or different, $R^2$ represents a cycloalkanediyl, cycloalkenediyl or arenediyl group with the proviso that a plurality of $R^2$ groups may be the same or different, and n represents an average degree of polymerization and is a number of 1 to 30; (B) a polyfunctional (meth)acrylic monomer and/or oligomer; and (C) a thermal polymerization initiator.

11 Claims, No Drawings

RESIN COMPOSITIONS, FILMS USING THE SAME AND PROCESS FOR PRODUCING THE FILMS

BACKGROUND OF THE INVENTION

1. Field of the Invention

The present invention relates to resin compositions containing a reactive oligomer having allyl ester groups, films using the resin compositions and a process for producing the films.

2. Description of Prior Art

Molded articles of an allyl ester resin have excellent heat resistance, transparency, weatherability, electrical properties and mechanical properties and are also recently found to have excellent optical properties. Therefore, the molded articles are advantageously used in various applications such as laminated plastics, artificial marbles and anti-crack materials for unsaturated polyester resins as well as optical materials such as lenses, spectacle lenses, optical discs and prisms.

The molded articles using such an allyl ester resin are generally produced by cast molding in which the liquid resin is injected into a glass mold or a metal mold and then heated for curing, or by compression molding in which a clay-like mass obtained by mixing the liquid resin with a filler is placed in a metal mold and heated under pressure for curing (for example, refer to Patent Document 1)

The form of optical materials as required is diversified along with recent development of an optical industry. In particular, there are increasing needs for components of various image display devices, such as liquid crystal panels and liquid crystal display devices, and for film-shaped molded articles used in self emission type display devices other than liquid crystal display devices, such as organic electroluminescence (EL) display, plasma display (PD) and field emission display (FED) devices. As the film-shaped molded articles, molded articles of an allyl ester resin having excellent heat resistance, transparency and optical properties are promising. However, in the molding method for an allyl ester resin disclosed in the Patent Document 1, etc., it is difficult to prepare a thin film molded article having a thickness of about 100 μm with a high thickness precision. Thus, there is a demand for development of film-shaped molded articles of an allyl ester resin.

Patent Document 1: JP 2002-69035A

SUMMARY OF THE INVENTION

It is, therefore, an object of the present invention to provide a resin composition containing a reactive oligomer having allyl ester groups, a film of such a resin composition having excellent transparency, excellent heat resistance and a high thickness precision, and a process for producing the above film.

The present inventors have made an earnest study for solving the above problem and have found that a resin composition containing a specific reactive oligomer having allyl ester groups is suited for producing a film-like molded article having excellent transparency, excellent heat resistance and a high thickness precision. The present invention has been accomplished on the basis of the above finding.

That is, the present invention provides the following aspects relating to a resin composition, a film of such a resin composition and a process for producing the film:

1. A resin composition including the following components (A) to (C):

(A) a reactive oligomer having allyl ester groups and represented by the following general formula (1):

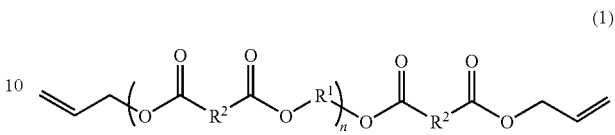

wherein $R^1$ represents an alkanediyl or alkenediyl group having 1 to 4 carbon atoms with the proviso that a plurality of $R^1$ groups may be the same or different, $R^2$ represents a cycloalkanediyl, cycloalkenediyl or arenediyl group with the proviso that a plurality of $R^2$ groups may be the same or different, and n represents an average degree of polymerization and is a number of 1 to 30;

(B) a polyfunctional (meth)acrylic monomer and/or oligomer; and (C) a thermal polymerization initiator.

2. The resin composition as described in the above aspect 1, further including (D) a photopolymerization initiator.

3. The resin composition as described in the above aspect 1, further including (E) an allyl ester monomer represented by the following general formula (2):

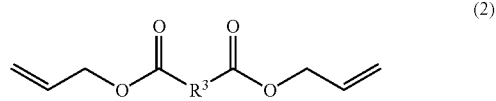

wherein $R^3$ represents an alkanediyl, an alkenediyl group, a cycloalkanediyl group, a cycloalkenediyl group or an arenediyl group.

4. A semi-cured film obtained by spreading the resin composition as described in the above aspects 1 on a substrate, and then gelating the spread resin composition by energy ray irradiation.

5. A cured film obtained by thermally treating the semi-cured film as described in the above aspect 4.

6. A process for producing a semi-cured film, including the steps of spreading the resin compositions as described in the above aspects 1 on a substrate, and irradiating the spread resin composition with an energy ray.

7. A process for producing a cured film, including the steps of spreading the resin composition as described in the above aspects 1 on a substrate, irradiating the spread resin composition with an energy ray, and thermally treating the spread resin composition.

EFFECT OF THE INVENTION

According to the present invention, it is possible to provide a resin composition containing a reactive oligomer having allyl ester groups, a film of the resin composition having excellent transparency, excellent heat resistance and high thickness precision, and a process for producing such a film.

DETAILED DESCRIPTION OF THE INVENTION

Component (A) of Resin Composition:

The resin composition of the present invention includes, as component (A), a reactive oligomer having allyl ester groups and represented by the following formula (1):

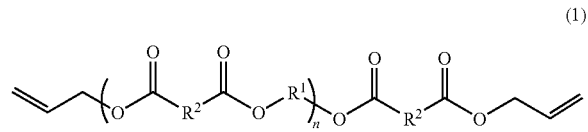

In the above general formula (1), $R^1$ represents an alkanediyl or alkenediyl group having 1 to 4 carbon atoms, and $R^2$ represents a cycloalkanediyl, cycloalkenediyl or arenediyl group. When there are a plurality of $R^1$ groups, these $R^1$ groups may be the same or different. Also, when there are a plurality of $R^2$ groups, these $R^2$ groups may be the same or different. Each of the $R^1$ and $R^2$ groups may be straight-chain or branched-chain and may be unsubstituted or substituted with one or more substituent groups. Examples of the substituent groups include, but not limited to, a halogen atom, a hydroxyl group, an amino group, an imino group, an amide group and a carboxyl group. From the viewpoint of obtaining good film forming property, $R^1$ is preferably a methylene group, an ethylene group or an propylene group, while $R^2$ is preferably a cyclohexanediyl group or a phenylene group. The n represents an average degree of polymerization and is a number of 1 to 30. From the standpoint of film forming property and strength of the film, n is preferably 1 to 10.

The reactive oligomer has a weight-average molecular weight of 300 to 10,000, preferably 500 to 9,000, more preferably 800 to 8,000. When the weight-average molecular weight of the reactive oligomer lies within the above specified range, good processability of the resin composition upon forming into a film may be suitably attained. As used herein, the term "weight-average molecular weight" means the value as measured by gel permeation chromatography in terms of polystyrene.

The reactive oligomer having allyl ester groups as the component (A) which is represented by the general formula (1) may be synthesized by any suitable known method. For example, there may be used a method in which a di(meth)allyl ester of a dicarboxylic acid or an anhydride thereof is subjected to transesterification with a polyhydric alcohol in the presence of a catalyst (for example, refer to JP 06-73145A), and a method in which a lower ester of allyl alcohol and a saturated polycarboxylic acid is reacted with a polyhydric alcohol (for example, refer to JP 02-251509A). The thus obtained reactive oligomer contains a residual raw material monomer having a low molecular weight. Since such a monomer serves as a diluent and is copolymerizable with the reactive oligomer, it is possible to use the obtained reactive oligomer as such for the purpose of the present invention without removing the monomer from the oligomer. The reactive oligomer may be a product synthesized as above or a commercial product available, for example, under the trade names of PP201, DA101 and BA901 (all manufactured by SHOWA DENKO K.K.).

Component (B) of Resin Composition:

The resin composition of the present invention includes an energy ray-curable polyfunctional (meth)acryl monomer and/or oligomer as component (B). The component (B) is instantaneously curable by energy ray irradiation. Therefore, the resin composition of the present invention which contains the component (B) can quickly solidify when irradiated with an energy ray to form a film which is not easily deformed. As a consequence, the resin composition of the present invention can achieve excellent thickness precision.

The polyfunctional (meth)acrylic monomer is preferably a (meth)acrylate having two or more ethylenically unsaturated bonds within the molecule. Specific examples of the polyfunctional (meth)acrylic monomer include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol hydroxypivalic acid di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate and ethylene oxide-modified bisphenol A diacrylate. These polyfunctional (meth)acrylic monomers may be used singly or in combination of two or more thereof.

Examples of the polyfunctional (meth)acrylic oligomer include an epoxy(meth)acrylate-based oligomer, a urethane (meth)acrylate-based oligomer, a polyester(meth)acrylate-based oligomer and a polyether(meth)acrylate-based oligomer. The epoxy(meth)acrylate-based oligomer may be obtained, for example, by esterifying the oxirane ring of a bisphenol type or a novolak type epoxy resin having a relatively low molecular weight with (meth)acrylic acid. And the epoxy(meth)acrylate-based oligomer may be partially modified with a dibasic carboxylic anhydride. Such a carboxyl-modified epoxy(meth)acrylate-based oligomer may also be suitably used.

As the polyfunctional (meth)acrylic oligomer, there may also be used a high hydrophobic polybutadiene (meth)acrylate-based oligomer having (meth)acrylate groups in side chains of a polybutadiene oligomer, a silicone (meth)acrylate-based oligomer having polysiloxane bonds in the main chain, an aminoplast resin (meth)acrylate-based oligomer which is obtained by modifying an aminoplast resin having a number of reactive groups in its small molecule, and an oligomer having a cationic polymerizable functional group in the molecule, such as a novolak type epoxy resin, a bisphenol type epoxy resin, an aliphatic vinyl ether or an aromatic vinyl ether.

Component (C) of Resin Composition:

The thermal polymerization initiator as the component (C) is used for accelerating curing of the resin composition. Ordinarily employed thermal polymerization initiators may be used as the component (C) in the present invention without particular limitation.

Examples of the component (C) include hydrogen peroxide; peroxodisulfate salts such as ammonium peroxodisulfate, sodium peroxodisulfate and potassium peroxodisulfate; azo compounds such as 2,2'-azobis(2-amidinopropane)dihydrochloride, 4,4'-azobis(4-cyanovalelic acid), 2,2'-azobisisobutyronitrile and 2,2'-azobis(4-methoxy-2,4-dimethylvalelonitrile); and organic peroxides such as benzoyl peroxide, lauroyl peroxide, peracetic acid, persuccinic acid, di-t-butyl peroxide, t-butyl hydroperoxide and cumene hydroperoxide. These thermal polymerization initiators may be used singly or in combination of two or more thereof.

Component (D) of Resin Composition:

The photopolymerization initiator as the component (D) is preferably used for the purpose of instantaneously curing the resin composition when using UV rays as an energy ray to thereby obtain a film having a high thickness precision. Ordinarily employed photopolymerization initiators may be used in the present invention without particular limitation.

Examples of the photopolymerization initiator include phenone-based photopolymerization initiators such as acetophenone, dimethylaminoacetophenone, 2,2-dimethoxy-2-phenyl acetophenone and 2,2-diethoxy-2-phenyl acetophenone; ketone-based photopolymerization initiators such as 2-hydroxy-2-methyl-1-phenyl propane-1-one, 1-hydroxy-cyclohexyl phenyl ketone, 2-methyl-1-[4-(methylthio)phenyl]-2-morpholinopropane-1-one, 4-(2-hydroxyethoxy)phenyl-2-(hydroxy-2-propyl)ketone; benzoin, benzoin alkyl ethers, benzoin hydroxyalkyl ethers, diacetyl and derivatives thereof, anthraquinone and derivatives thereof, diphenyl disulfide and derivatives thereof, benzophenone and derivatives thereof; benzyl and derivatives thereof, 2,2'-azobis(2-amidinopropane), 2,2'-azobis(N,N'-dimethyleneisobutylamidine), 2,2'-azobis[2-(5-methyl-2-imidazolin-2-yl)propane], 1,1'-azobis(i-amidino-1-cyclopropylethane), 2,2'-azobis(2-amidino-4-methylpentane), 2,2'-azobis(2-N-phenylaminoamidinopropane), 2,2'-azobis(l-imino-1-ethylamino-2-methylpropane), 2,2'-azobis(1-allylamino-1-imino-2-methylbutane), 2,2'-azobis(2-N-cyclohexylamidinopropane), 2,2'-azobis(2-N-benzylamidinopropane), and hydrochloride, sulfate and acetate thereof; 4,4'-azobis(4-cyanovaleric acid) and alkali metal salts, ammonium salts and amine salts thereof; water-soluble azo-based photopolymerization initiators such as 2-(carbamoylazo)isobutyronitrile, 2,2'-azobis(isobutylamide], 2,2'-azobis[2-methyl-N-(2-hydroxyethyl)propionamide], 2,2'-azobis[2-methyl-N-(1,1'-bis(hydroxymethyl)-ethyl)propionamide], 2,2'-azobis[2-methyl-N-(1,1'-bis(hydroxyethyl)propionamide]; and 2-hydroxy-2-methyl-1-phenyl propane-1-one. These photopolymerization initiators may be used singly or in combination with two or more thereof.

Component (E) of Resin Composition:

The resin composition of the present invention may optionally include an allyl ester monomer as a component (E). The component (E) is preferably used as a diluent, etc. Any allyl ester monomer may be used without particular limitation as long as it is copolymerizable with the component (A). From the standpoint of heat resistance and solvent resistance of the film obtained from the resin composition, an allyl ester monomer represented by the following general formula (2) is preferred:

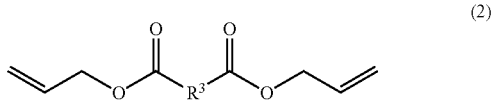

(2)

In the general formula (2), $R^3$ represents an alkanediyl group, an alkenediyl group, a cycloalkanediyl group, a cycloalkenediyl group or an arenediyl group. From the standpoint of heat resistance and solvent resistance of the film obtained from the resin composition, the $R^3$ group is preferably an alkanediyl group, a cyclohexanediyl group or a phenylene group. More specifically, as the allyl ester monomer of the general formula (2), at least one compound selected from diallyl adipate monomer, diallyl cyclohexanedicarboxylate, diethylene glycol diallyl carbonate, diallyl phthalate monomer and diallyl isophthalate monomer, is preferably used from the standpoint of heat resistance and solvent resistance of the film obtained from the resin composition.

Additives of Resin Composition:

The resin composition of the present invention may contain, if desired, one or more additives ordinarily employed for resin compositions as long as the effect of the present invention is not adversely affected. Examples of the additives include a weatherability improver, a wear resistance improver, a polymerization inhibitor, an infrared absorbent, an antistatic agent, an adhesion improver, a leveling agent, a thixotropy imparting agent, a coupling agent, a plasticizer, a defoaming agent, a filler, a solvent and a coloring agent.

A UV absorbent and a light stabilizer may be used as the weatherability improver. Both inorganic and organic UV absorbents may be used. Specific examples of the inorganic UV absorbent include particles of metal oxides such as titanium dioxide, cerium oxide and zinc oxide having an average particle diameter of about 5 to 120 nm. Specific examples of the organic UV absorbent include benzotriazole compounds. The light stabilizer may be, for example, a hindered amine-based compound. And reactive UV absorbents and light stabilizers each having a polymerizable group such as a (meth) acryloyl group in the molecule may also be used as the UV absorbents and light stabilizers.

Examples of the wear resistance improver include inorganic particles such as particles of α-alumina, silica, kaolinite, iron oxide, diamond and silicon carbide; and organic synthetic resin beads such as beads of cross-linked acrylic resin and polycarbonate resin. The shape of the particles is not specifically limited and may be, for example, a spherical shape, an oval shape, a polyhedral shape and a scale-like shape. Among them, spherical particles are preferably used although not limited thereto. The particle size of the wear resistance improver in the form of particles is generally about 10 to 200% of the thickness of the film to be prepared. In particular, spherical α-alumina is especially preferred because it has a high hardness, can exhibit a large effect of improving the wear resistance, and is relatively easily available in the form of spherical particles.

Examples of the polymerization inhibitor include hydroquinone, p-benzoquinone, hydroquinone monomethyl ether, pyrogallol and t-butylcatechol. Examples of the cross-linking agent include polyisocyanate compounds, epoxy compounds, metal chelate compounds, aziridine compounds and oxazoline compounds.

Examples of the filler include barium sulfate, talc, clay, calcium carbonate, surface-hydrophobized calcium carbonate, carbon black and aluminum hydroxide.

Examples of the coloring agent include known coloring pigments such as quinacridone red, isoindolinone yellow, phthalocyanine blue, phthalocyanine green, titanium oxide and carbon black. Examples of the infrared absorbent include dithiol-based metal complexes, phthalocyanine compounds and diimmonium compounds.

Resin Composition:

The components (A) to (C) which are essential components of the resin composition are preferably present in amounts of (A) 30 to 98.7% by mass, (B) 1 to 30% by mass and (C) 0.1 to 10% by mass, respectively, more preferably (A) 40 to 87% by mass, (B) 3 to 20% by mass and (C) 1 to 5% by mass, respectively, all based on the total amount of the resin composition, from the viewpoint of obtaining good film forming property. The component (D) is preferably present in an amount of 0.1 to 10% by mass, more preferably 1 to 5% by mass, based on the total amount of the resin composition, from the viewpoint of obtaining improved film thickness precision. The component (E) is preferably present in an amount of 0.1 to 60% by mass, more preferably 8 to 50% by mass, based on the total amount of the resin composition, from the viewpoint of obtaining good film forming property.

Semi-Cured Film and Process for Production Thereof:

A semi-cured film of the present invention may be obtained by a process including spreading the resin composition of the present invention on a substrate, and irradiating the spread resin composition with an energy ray to gelate the resin composition. As used herein, the term "semi-cured" means a condition in which part of the monomer or oligomer contained in the resin composition is cross-linked to form a three-dimensional network structure, and unreacted components are held within the network structure.

The degree of gelation is controlled such that the "gel fraction" of the semi-cured film is generally 1 to 50%, preferably 3 to 30%. When the "gel fraction" lies within the above specified range, the form of the film may be retained so that a good film thickness precision may be obtained. The term "gel fraction" as used herein means an index of the degree of curing of the semi-cured film and is measured as follows. A sample of the produced semi-cured film with a mass A is refluxed in acetone for 3 hours to extract and collect the acetone-insoluble matters therefrom. A dry mass B of the acetone-insoluble matters is weighed. The "gel fraction" is calculated as a percentage of the mass B relative to the mass A.

There is no specific limitation on the substrate as long as it is not deteriorated when irradiated with an energy ray. Examples of the substrate include sheets of a resin such as a polyethylene resin, a polypropylene resin and a polyethylene terephthalate resin. The thickness of the substrate is not specifically limited but is generally about 10 to 500 µm, preferably 20 to 200 µm, more preferably 25 to 100 µm.

The substrate may be in the form of a release sheet provided with a releasing agent layer formed by applying a releasing agent on a surface of the substrate, for the purpose of easily peeling off the semi-cured film from the substrate. In this case, the release sheet may be provided on one side or both sides of the semi-cured film. For example, the resin composition is spread (applied) onto the releasing agent layer of the release sheet to form a coating layer thereof having a given thickness after dried, and the applied resin composition is irradiated with an energy ray from the side of resin composition and gelated to form a semi-cured film. On the thus formed semi-cured film, another release sheet is laminated to obtain a laminate having two release sheets on both sides of the semi-cured film.

The releasing agent may be, for example, an alkyd-based resin releasing agent or a silicone-based resin releasing agent, and is applied on the surface of the substrate to form the release agent layer thereon. The thickness of the release agent layer is not particularly limited, and generally about 1 to 30 µm, preferably 1 to 10 µm.

The resin composition may be spread on the substrate by various suitable known methods such as roll coating, spray coating or spin coating without particular limitation. A coating amount of the resin composition on the substrate may be suitably adjusted so that a film obtained after curing has a desired thickness.

The energy ray used for curing the resin composition may be, for example, an ionizing radiation such as UV rays or electron beams. When UV rays are employed as the energy ray, light containing UV rays having a wavelength of 190 to 380 nm may be suitably used. The UV dose may be suitably determined according to the resin composition and the film thickness and is generally in the range of about 50 to 500 $mJ/cm^2$, preferably 100 to 450 $mJ/cm^2$, more preferably 100 to 200 $mJ/cm^2$. The illuminance of the UV rays is generally about 50 to 500 $mW/cm^2$, preferably 100 to 450 $mW/cm^2$, more preferably 200 to 400 $mW/cm^2$. Any UV source may be used without particular limitation for the purpose of the present invention. Examples of the UV source include a high pressure mercury-vapor lamp, a low pressure mercury-vapor lamp, a metal halide lamp and a carbon arc lamp.

When electron beams are employed as the energy ray, the electron beam accelerating voltage may be suitably determined according to the resin composition and the film thickness and is generally in the range of about 70 to 300 kV. The irradiation is performed with a dose of the degree to which the resin composition is gelated. The irradiation dose is generally in the range of 5 to 300 kGy (0.5 to 30 Mrad), preferably 10 to 50 kGy (1 to 5 Mrad). Any electron beam source may be used without particular limitation for the purpose of the present invention. Examples of the electron beam source include various electron beam accelerators such as a Cockcroft-Walton accelerator, a van de Graaff accelerator, a resonance transformer accelerator, an insulation core transformer accelerator, a linear accelerator, a dynamitron accelerator and a high frequency accelerator.

The thickness of the semi-cured film may vary depending upon its end use and is generally about 10 to 300 µm, preferably 50 to 200 µm, more preferably 50 to 150 µm.

The semi-cured film of the present invention is suited for use as optical materials, in particular, as production of display optical films such as plastic substrates for display drive circuits, phase difference films, view-angle enlarging films, luminance improving plates, reflection films and optical guide films. The semi-cured film may be used in the form of a laminate with any other suitable film or a glass plate, etc.

Cured Film and Process for Production Thereof:

A cured film of the present invention may be obtained by a process including spreading the resin composition of the present invention on a substrate, irradiating the spread resin composition with an energy ray, and thermally treating the spread resin composition. More specifically, the cured film may be obtained by first preparing a semi-cured film by energy ray irradiation of the resin composition of the present invention, and the semi-cured film is thereafter thermally treated to obtain the cured film. Alternatively, the spread resin composition is thermally treated while being irradiated with an energy ray to obtain the cured film. The substrate and energy ray irradiation used in the process for producing the cured film are the same as those in the semi-cured film production process.

The thermal treatment may be carried out using a hot-air dryer, an oven, an autoclave or the like. The thermal treatment conditions may be properly determined in consideration of the thickness of the film obtained from the resin composition, etc. Generally, the thermal treatment is carried out at a temperature of 100 to 150° C., preferably 100 to 135° C., for 1 to 5 hours, preferably 1 to 3 hours to prevent deformation of the substrate.

The thickness of the cured film may vary depending upon its end use and is generally about 10 to 300 µm, preferably 50 to 200 µm, more preferably 50 to 150 µm.

The cured film of the present invention is suited for use as optical materials, in particular, components of various image display devices, such as liquid crystal panels and liquid crystal display devices, and components used in self emission type display devices other than liquid crystal display devices, such as organic electroluminescence (EL) display, plasma display (PD) and field emission display (FED) devices.

The cured film, when used as an optical material as described above, preferably has a tensile fracture stress of 30,000 mN/15 mm or more, an in-plane phase difference of 10 nm or less, more preferably 5 nm or less, a transparency of 85% or more, more preferably 90% or more, in terms of a total light transmittance, a heat resistance of 2% or less, more preferably 1% or less, in terms of a change of length as evaluated by the method described hereinafter, and a thickness precision of 20 μm or less, more preferably 10 μm or less, in terms of an precision value as measured by the method described hereinafter.

EXAMPLES

The present invention will be described in more detail below by way of examples. However, it should be noted that the present invention is not limited to these examples.

Evaluation Method:

Films obtained in Examples and Comparative Examples were evaluated by the following methods.

(1) Measurement of Tensile Fracture Stress

Cured films obtained in Examples and Comparative Examples were measured for their tensile fracture stresses in accordance with JIS K 7161 and JIS K 7127. The thickness of the films was 100±10 μm and the test speed was 50 mm/min.

(2) Evaluation of Optical Property

The cured films obtained in Examples and Comparative Examples were measured for their in-plane phase differences using a phase difference measuring device (KOBRA-WR (trade name) manufactured by Oji Scientific Instrument).

(3) Evaluation of Transparency

Total light transmittance of each of the cured films was measured in accordance with JIS K7361-1 using a haze meter (Model NDH2000 manufactured by Nippon Denshoku Industries Co., Ltd.

(4) Evaluation of Heat Resistance

Using a thermal analyzer (System Model WS002 manufactured by Mac Science Co., Ltd.), each of the cured films was heated from room temperature to 170° C. (film width: 4.5 mm, chuck distance: 15 mm, heating rate 10° C./min, load: 2 mN) and a change (%) of the length at 160° C. relative to the initial length was measured.

(5) Evaluation of Thickness Precision

Edges of the semi-cured films and cured films were cut to prepare sheets with a dimension of 210 mm×297 mm. Each sheet was measured for its thickness at total 20 points (intersections of four longitudinal lines and five transverse lines), and the average and a difference between the maximum and minimum thicknesses (as thickness precision) were determined.

A releasing agent (a releasing agent of an alkyd-based resin) was applied onto a PET film (SP-PET38X (trade name) manufactured by Lintec Corporation, thickness: 38 μm) to form a release agent layer thereon. Resin compositions of Examples 1 to 5 and Comparative Example 1 prepared with the formulations and blending ratios (mass ratios) shown in Table 1 were each applied to a surface of the release agent layer with an applicator such that the resin composition layer after curing had a thickness of 100 μm. The applied resin compositions were irradiated with UV rays under conditions of 300 mW/cm$^2$ and 150 mJ/cm$^2$ using a UV irradiator (FUSION H LAMP (trade name)) to gelate (semi-cure) the resin compositions, thereby obtaining semi-cured films. Each of the semi-cured films was overlaid with a PET film (SP-PET381031 (trade name) manufactured by Lintec Corporation, thickness: 38 μm) having a release agent layer formed by applying a releasing agent of a silicone-based resin onto the PET film, such that the release agent layer was in contact with the semi-cured film. The resulting laminate was placed in an oven at 130° C. and allowed to stand for 2 hours. Thereafter, the release films on both sides were removed to obtain cured films each having a thickness of 100 μm.

The results of evaluation on item (5) of the obtained semi-cured films and the results of evaluation on items (1) to (5) of the obtained cured films are shown in Table 2.

TABLE 1

|  | Example 1 | Example 2 | Example 3 | Example 4 | Comparative Example 1 |
|---|---|---|---|---|---|
| DA101 *1 (Components A + E) | 100 | — | — | — | — |
| BA901 *2 (Components A + E) | — | 100 | — | — | — |
| PP201 *3 (Components A + E) | — | — | 100 | 100 | 100 |
| A-DPH *4 (Component B) | 10 | 10 | 5 | 15 | — |
| Irg500 *5 (Component D) | 0.5 | 2 | 2 | 3 | 2 |
| Dicumyl *6 (Component C) | 2 | 2 | 2 | 2 | 2 |

*1: DA101: Composition (manufactured by Showa Denko K. K.) composed of 85% of a reactive oligomer containing allyl ester groups (Component A) and 15% of diallyl 1,4-cyclohexanedicarboxylate (Component E) as an allyl ester monomer
*2: BA901: Composition (manufactured by Showa Denko K. K.) composed of 60% of a reactive oligomer containing allyl ester groups (Component A) and 40% of diallyl isophthalate (Component E) as an allyl ester monomer
*3: PP201: Composition (manufactured by Showa Denko K. K.) composed of 55% of a reactive oligomer containing allyl ester groups (Component A) and 45% of diallyl 1,4-cyclohexanedicarboxylate (Component E) as an allyl ester monomer
*4: A-DPH: Dipentaerythritol hexaacrylate (NK ESTER A-DPH (trade name) manufactured by Shin-Nakamura Chemical Co., Ltd.)
*5: Irg500: Photopolymerization initiator (IRGACURE 500 (trade name) manufactured by Ciba Specialty Chemicals Inc.)
*6: Dicumyl: Thermal polymerization initiator (dicumylperoxide manufactured by Sigma-Aldrich Japan K. K.)

TABLE 2

|  | Tensile fracture stress (mN/15 mm) | In-plane phase difference (nm) | Transparency (%) | Heat resistance (μm) | Thickness precision (μm) Cured | Thickness precision (μm) Semi-cured | Average thickness (μm) Cured | Average thickness (μm) Semi-cured |
|---|---|---|---|---|---|---|---|---|
| Example 1 | 65,000 | 1.5 | 92 | 0.7 | 5 | 6 | 104 | 105 |
| Example 2 | 50,000 | 1.5 | 91 | 0.6 | 6 | 5 | 98 | 100 |
| Example 3 | 40,000 | 1.5 | 92 | 0.8 | 6 | 6 | 101 | 103 |

TABLE 2-continued

| | Tensile fracture stress (mN/ 15 mm) | In-plane phase difference (nm) | Transparency (%) | Heat resistance (μm) | Thickness precision (μm) | | Average thickness (μm) | |
|---|---|---|---|---|---|---|---|---|
| | | | | | Cured | Semi-cured | Cured | Semi-cured |
| Example 4 | 42,000 | 1.5 | 92 | 0.8 | 6 | 5 | 102 | 103 |
| Comp. Example 1 | — | — | — | — | — | — | — | — |

It was revealed that the cured films prepared in Examples 1 to 4 exhibited excellent results in all the evaluation items and had excellent transparency, excellent heat resistance, high thickness precision and excellent mechanical strengths. On the other hand, the resin composition of Comparative Example 1 containing no polyfunctional (meth)acrylic monomer did not form a film with uniform thickness even when irradiated with UV rays and was not able to obtain a cured film.

What is claimed is:

1. A resin composition comprising the following components (A) to (C):
   (A) a reactive oligomer having allyl ester groups and represented by the following general formula (1):

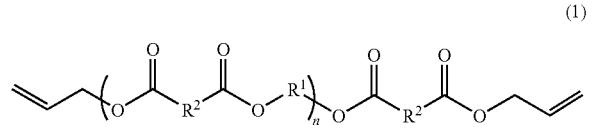

wherein $R^1$ represents an alkanediyl or alkenediyl group having 1 to 4 carbon atoms with the proviso that a plurality of $R^1$ groups may be the same or different, $R^2$ represents a cycloalkanediyl, cycloalkenediyl or arenediyl group with the proviso that a plurality of $R^2$ groups may be the same or different, and n represents an average degree of polymerization and is a number of 1 to 30;
   (B) a polyfunctional (meth)acrylic monomer and/or oligomer; and
   (C) a thermal polymerization initiator.

2. The resin composition according to claim 1, further comprising (D) a photopolymerization initiator.

3. The resin composition according to claim 1, further comprising (E) an allyl ester monomer represented by the following general formula (2):

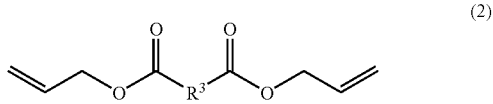

wherein $R^3$ represents an alkanediyl group, an alkenediyl group, a cycloalkanediyl group, a cycloalkenediyl group or an arenediyl group.

4. The resin composition according to claim 1, wherein contents of the components (A) to (C) in the resin composition are (A)30 to 98.7% by mass, (B)1 to 30% by mass and (C)0.1 to 10% by mass, respectively.

5. The resin composition according to claim 2, wherein contents of the components (A) to (D) in the resin composition are (A)30 to 98.7% by mass, (B)1 to 30% by mass, (C)0.1 to 10% by mass and (D)0.1 to 10% by mass, respectively.

6. The resin composition according to claim 3, wherein contents of the components (A) to (E) in the resin composition are (A)30 to 98.7% by mass, (B)1 to 30% by mass, (C)0.1 to 10% by mass, (D)0.1 to 10% by mass and (E)0.1 to 60% by mass, respectively.

7. The resin composition according to claim 1, wherein the resin composition is used to form a film.

8. A semi-cured film obtained by spreading the resin composition as defined in claim 1 on a substrate, and then gelating the spread resin composition by energy ray irradiation.

9. A cured film obtained by thermally treating the semi-cured film as defined in claim 8.

10. A process for producing a semi-cured film, comprising the steps of spreading the resin composition as defined in claim 1 on a substrate, and irradiating the spread resin composition with an energy ray.

11. A process for producing a cured film, comprising the steps of spreading the resin composition as defined in claim 1 on a substrate, irradiating the spread resin composition with an energy ray, and thermally treating the spread resin composition.

* * * * *